US007756049B2

(12) United States Patent
Chen et al.

(10) Patent No.: US 7,756,049 B2
(45) Date of Patent: Jul. 13, 2010

(54) APPARATUS, SYSTEM, AND METHOD FOR CONTROLLING LINK STATUS CHANGES

(75) Inventors: James Chien-Chiung Chen, Tucson, AZ (US); Lourdes Magally Gee, Tucson, AZ (US); Olympia Gluck, Haifa (IL); Richard Alan Schaeffer, Antioch, CA (US); David Brent Schreiber, Tucson, AZ (US); William Henry Travis, Tucson, AZ (US); Gabriel G. Walder, K. Haim (IL)

(73) Assignee: International Business Machines Corporation, Armonk, NY (US)

( * ) Notice: Subject to any disclaimer, the term of this patent is extended or adjusted under 35 U.S.C. 154(b) by 1553 days.

(21) Appl. No.: 10/915,791

(22) Filed: Aug. 11, 2004

(65) Prior Publication Data

US 2006/0034189 A1 Feb. 16, 2006

(51) Int. Cl.
*H04L 12/26* (2006.01)
*H04L 12/54* (2006.01)

(52) U.S. Cl. ..................................... 370/252; 370/428

(58) Field of Classification Search ................. 370/236, 370/241, 252, 428, 254, 351, 389, 429; 709/223, 709/224; 710/62, 63, 65, 15, 18, 19; 713/500, 713/502
See application file for complete search history.

(56) References Cited

U.S. PATENT DOCUMENTS

| 5,188,850 | A | 2/1993 | Hirata et al. | 425/589 |
|---|---|---|---|---|
| 5,452,421 | A | 9/1995 | Beardsley et al. | 395/182.02 |
| 5,640,603 | A | 6/1997 | Meritt et al. | 395/858 |
| 5,867,497 | A | 2/1999 | Fujimori et al. | 370/384 |
| 6,075,775 | A | 6/2000 | Ueki | 370/248 |
| 6,175,870 | B1 | 1/2001 | Gawlick et al. | 709/227 |
| 6,353,593 | B1 | 3/2002 | Chen et al. | 370/216 |
| 6,594,268 | B1 | 7/2003 | Aukia et al. | 370/400 |
| 7,493,431 | B2 * | 2/2009 | McLeod | 710/63 |
| 2003/0016688 | A1 * | 1/2003 | Hoof | 370/417 |
| 2003/0126315 | A1 * | 7/2003 | Tan et al. | 710/1 |
| 2003/0172314 | A1 * | 9/2003 | Walter | 713/502 |
| 2004/0268131 | A1 * | 12/2004 | Kudo et al. | 713/182 |
| 2005/0209804 | A1 * | 9/2005 | Basso et al. | 702/79 |

* cited by examiner

*Primary Examiner*—Frank Duong
*Assistant Examiner*—Feben Haile
(74) *Attorney, Agent, or Firm*—Kunzler Needham Massey & Thorpe (57) ABSTRACT

An apparatus, system, and method are provided for controlling link status changes across multiple independent control modules. The apparatus includes a copy services module configured to control multiple link adapters, each configured to establish multiple communication links between a source and a target storage device. The adapter transmits a link status change notification to the copy services module and starts a timer upon transmitting the link status change notification. The copy services module simultaneously processes link status change notifications from a plurality of communication links. The system includes a communications network and a plurality of storage devices having the above described apparatus. The method includes controlling a plurality of link adapters configured to establish multiple communication links between storage devices, transmitting a link status change notification, starting a timer upon transmitting the link status change notification, and simultaneously processing link status change notifications from a plurality of communication links.

18 Claims, 5 Drawing Sheets

| Path ⸝402 | Status ⸝404 | Last Reported Status ⸝406 |
|---|---|---|
| 204a | UP | UP |
| 204b | UP | UP |
| 204c | DOWN | DOWN |
| 204d | UP | UP |

| Path ⸝402 | Status ⸝404 | |
|---|---|---|
| 204a | UP | ⎫ |
| 204b | UP | ⎬ 412 |
| 204c | DOWN | |
| 204d | UP | ⎭ |
| 206a | DOWN | ⎫ |
| 206b | DOWN | ⎬ 414 |
| 206c | UP | |
| 206d | UP | ⎭ |
| . | . | |
| . | . | |
| 210b | UP | ⎫ |
| 210c | UP | ⎬ 416 |
| 210d | UP | ⎭ |

FIG. 4b

APPARATUS, SYSTEM, AND METHOD FOR CONTROLLING LINK STATUS CHANGES

FIELD OF THE INVENTION

This invention relates to input/output (I/O) tasks and data transfer between storage devices, and more particularly relates to controlling link state changes across multiple independent control components via message serialization.

DESCRIPTION OF THE RELATED ART

The explosion of information created by e-business is making storage a strategic investment priority for companies of all sizes. The nature of e-business requires storage that supports data availability so that employees, customers and trading partners can access the data at any time during any day through reliable, disaster-tolerant systems. In the event of a disaster, high data availability and recovery are essential to maintaining business continuity.

In order to prevent data loss during a disaster, such as a system failure or natural disaster, many companies rely on storage backups. A backup of data may be stored on removable media, such as tapes or writable optical disks. While removable media may be suitable for small companies, large corporations require immense amounts of storage capacity and therefore removable media is not a viable option for data backup. One solution for large corporations is storage servers. Storage servers are typically located on a common business network and configured to share data with nodes on the network. One such implementation is a storage area network (SAN). A SAN is a high-speed subnetwork of shared storage devices. A storage device is a machine that contains a disk or disks for storing data. Additionally, storage servers may be located remotely in order to provide data redundancy in the event of a complete site failure.

Storage servers support many data copy options. One widely used method of data transfer from a primary storage server to a remote storage server is peer-to-peer remote copy (PPRC). The PPRC function is a hardware-based solution for mirroring logical volumes from a primary site (the application site) onto the volumes of a secondary site (the recovery or remote site). PPRC can be managed using a Web browser to interface with the storage server or using commands for selected open systems servers that are supported by the storage server command-line interface. Additionally, copy functions such as flashcopy, PPRC extended distance copy, and extended remote copy are implemented.

Copy functions are processed over a variety of transmission mediums. Storage servers support a variety of connection interfaces. Such transmission mediums include Fibre Channel, 2 Gigabit Fibre Channel/FICON™, Ultra SCSI and ESCON®. Typically, multiple links or channels exist between the primary site and the recovery site. For PPRC over Fibre, three components are generally involved in establishment and removal of connection links, and the connection states of those links. The three modules may comprise a copy services (CS) module, a fixed block (FB) module, and a link adapter control module. The CS and FB module typically are operatively configured to function within a symmetric multiprocessor and control a plurality of connection adapters. Each adapter may have a processor and one control module.

The control module of each adapter is configured to maintain connection state information for logical links that have been established or are to be established on the corresponding adapter. The CS module also holds similar information regarding the connection status, however, the CS module maintains the connection status of each adapter. The CS module is configured to respond to channel commands by establishing or removing logical links on any one of the various adapters. Once the adapter has received a command from the CS module, the adapter connects to the target storage server. The CS module issues commands to verify the connection has been established with the correct target storage server. Should the connection state change (i.e. loss of light for some amount of time), the control module of the adapter is responsible for notifying the CS module of the state change so that the link will no longer be used.

A problem arises in attempting to sync the link connection status in the control module with the link status in the CS module. This is because the status of the link may change at a rate higher than the ability of the CS module to validate and update the link status. In order for the CS module to update link status, first the CS module needs to query and receive a response from the target storage server. With the large amounts of logical links, continuously updating of the link status makes synchronization very complex and time consuming.

Consequently, a need exists for a process, apparatus, and system that efficiently control link state changes across a plurality of independent control components, such as adapters, via message serialization.

SUMMARY OF THE INVENTION

The present invention has been developed in response to the present state of the art, and in particular, in response to the problems and needs in the art that have not yet been fully solved by currently available link status control systems. Accordingly, the present invention has been developed to provide a process, apparatus, and system for controlling link status changes across multiple independent modules that overcome many or all of the above-discussed shortcomings in the art.

The apparatus for controlling link status changes is provided with a logic unit containing a plurality of modules configured to functionally execute the necessary steps of updating and maintaining link status of a plurality of communication links. These modules in the described embodiments include a copy services module configured to control a plurality of link adapters, each link adapter having a control module configured to establish a plurality of communication links between a source and a target storage device. Additionally, the control module may be further configured to transmit a link status change notification to the copy services module and start a timer upon transmitting the link status change notification, and stop the timer upon receiving an acknowledgement from the copy services module. In a further embodiment, the copy services module may be configured to simultaneously process link status change notifications from a plurality of communication links.

In one embodiment, the control module is configured to stop the timer upon reaching a predefined time value, and reset in response to the timer reaching the predefined timeout value. Also, the control module is further configured to withhold subsequent link status change notifications until the acknowledgement message has been received from the copy services module or the predefined timeout value has been reached. The copy services module may maintain the link status for each of the plurality of communication links. In a further embodiment, the copy services module updates the link status in response to the received link status change notification and subsequent link validation.

A system of the present invention is also presented for controlling link status changes. In particular, the system, in one embodiment, includes a data communications network comprising a plurality of communication channels, and a source storage device coupled to the data communications network and configured to establish a plurality of communication links with a target storage device coupled to the data communications network. Additionally, the system may comprise a host coupled to the data communications network configured to transmit read/write requests to the source storage device, and a copy services module configured to control a plurality of link adapters, each link adapter having a control module configured to establish a plurality of communication links between a source and a target storage device.

In a further embodiment, the control module may be configured to transmit a link status change notification to the copy services module and start a timer upon transmitting the link status change notification, and stop the timer upon receiving an acknowledgement from the copy services module, and the copy services module is configured to simultaneously process link status change notifications from a plurality of communication links.

A computer readable medium is also presented for controlling link status changes. The computer readable medium may comprise computer readable code for a method that includes the steps necessary to carry out the functions presented above with respect to the operation of the described apparatus and system. In one embodiment, the method includes controlling a plurality of link adapters each having a control module and configured to establish a plurality of communication links between a source and a target storage device, transmitting a link status change notification to a copy services module, starting a timer upon transmitting the link status change notification, and stopping the timer upon receiving an acknowledgement from the copy services module, and simultaneously processing link status change notifications from a plurality of communication links.

In one embodiment, the method further comprises stopping the timer upon reaching a predefined time value. The method may also include resetting the control module and the copy services module in response to the timer reaching the predefined timeout value, and withholding subsequent link status change notifications until the acknowledgement message has been received from the copy services module or the predefined timeout value has been reached. In a further embodiment, the method further comprises validating the link status upon receiving the link status change notification, and updating the link status in response to the received link status change notification.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 1:
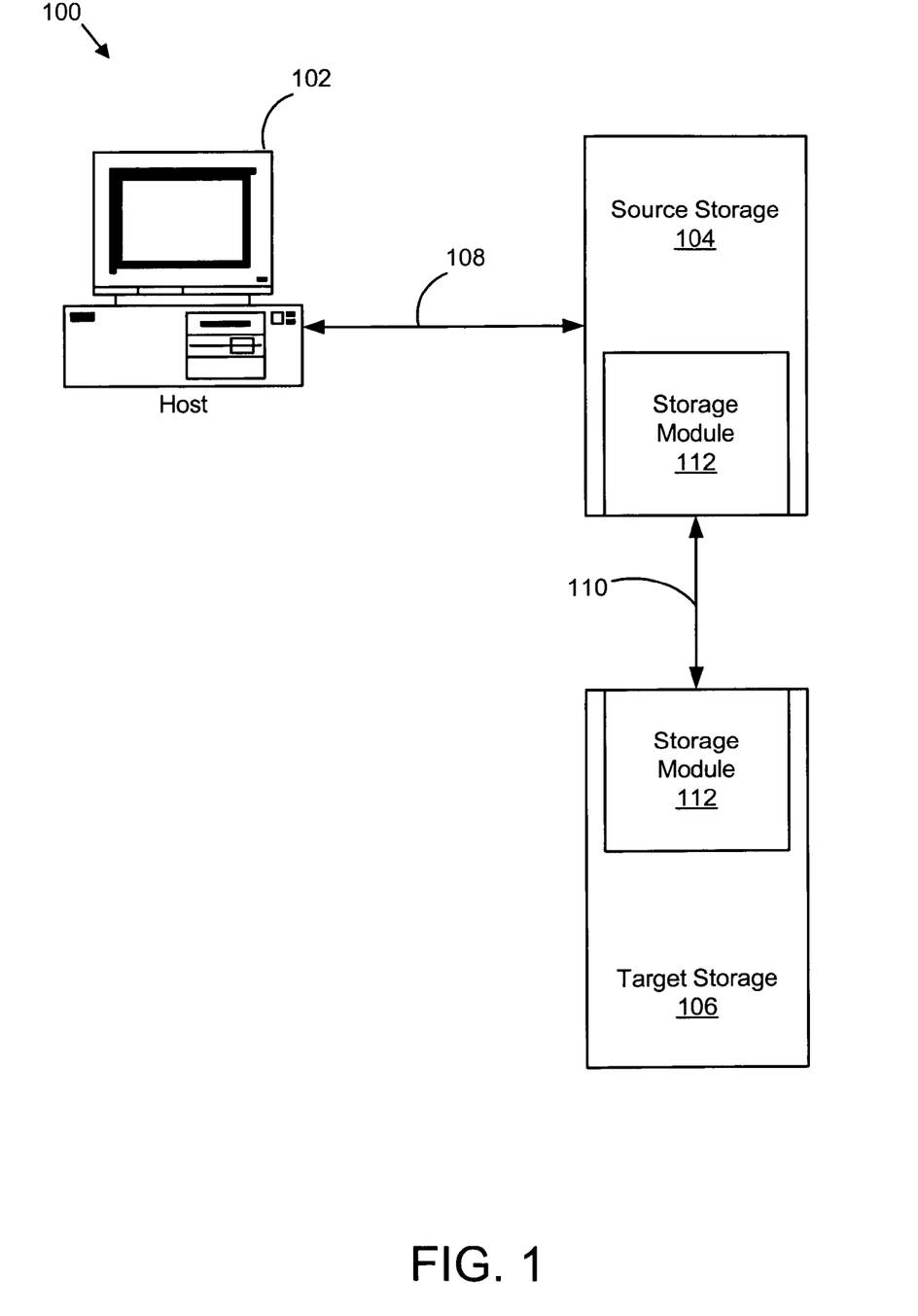
FIG. 1 is a schematic block diagram illustrating one embodiment of a system for controlling link state changes in accordance with the present invention.

FIG. 1 is a schematic block diagram graphically illustrating one embodiment of a system 100 for controlling link state changes. In one embodiment, the system 100 comprises a host 102 device, a source 104 storage device, and a target 106 storage device. The host 102, the source 104, and target 106 may be coupled by a communications network 108. The communication network 108 may be a local area network, wide area network, wireless local area network, virtual private network, virtual local area network, or the like.

In a further embodiment, a communication path 110 couples the source 104 and target 106. The communication path 110 may be a storage area network comprising a Fibre Channel transmission medium. Alternatively, the communication path may comprise 2. Gigabit Fibre Channel/FICON™, Ultra SCSI or ESCON® connections. The communication path 110 may be easily replaced with the communication network 108. The source 104 and target 106 storage devices may comprise storage module 112 configured to communicate and execute storage commands. The storage commands, also known as Perform System Function (PSF) commands are well known to those skilled in the art and will not be discussed further herein. In one embodiment, the source 104 and target 106 storage devices comprise Enterprise Storage Servers (ESS) such as the IBM® TotalStorage™ ESS™ Model 800 manufactured by IBM® of Armonk, N.Y.

Figure 2:
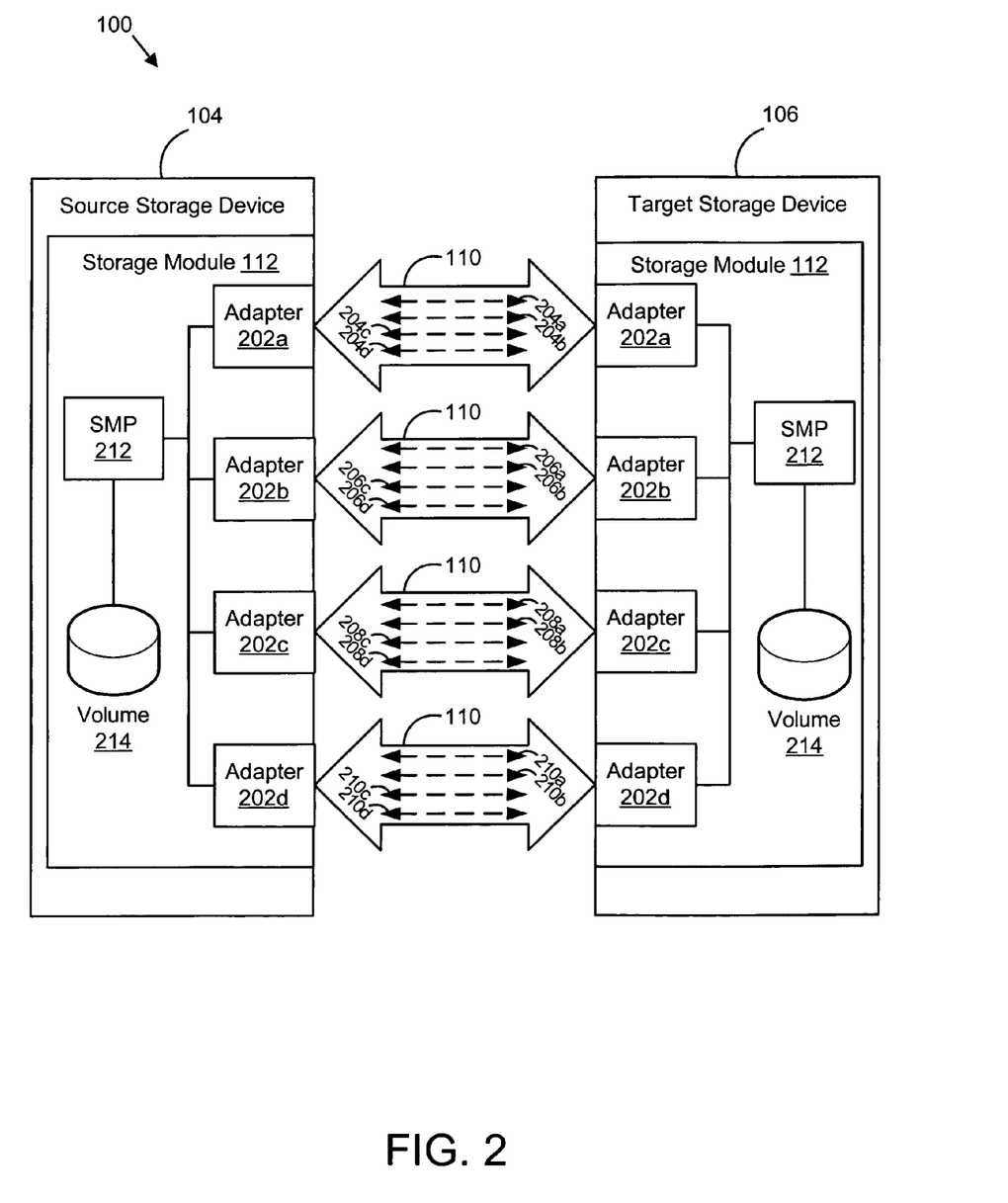
FIG. 2 is a schematic block diagram illustrating an alternative embodiment of a system for controlling link state changes in accordance with the present invention.

FIG. 2 is a schematic block diagram graphically illustrating an alternative embodiment of the system 100 for controlling link state changes in accordance with the present invention. In the depicted embodiment, the communication path 110 comprises a Fibre Channel (FC) connection. The storage modules 112 include a plurality of FC adapters (collectively referred to as "adapters 202"), each configured to establish a connection to an FC adapter 202 operating within the target storage device 106. Alternatively, the adapter 202 may comprise an adapter configured to establish connections over transmission media such as 2 Gigabit Fibre Channel/FICON™, Ultra SCSI, ESCON®, or Ethernet. Additionally, each FC adapter 202 is configured to establish a plurality of logical connections within each physical communication path 110.

In one embodiment, the adapter 202a of the source storage device 104 is configured to establish the communication path 110 with adapter 202a of the target storage device 106. The adapters 202a establish logical connections 204a, 204b, 204c, 204d within the communication path 110. Likewise, each adapter 202b, 202c, 202d is configured to establish a plurality of logical connections. The depicted embodiment illustrates four adapters 202, however, the source storage device 104 and the target storage device 106 may comprise any number of adapters 202. In a further embodiment, the source and target storage devices 104, 106 may comprise a symmetric multiprocessor (SMP) 212 and a storage volume 214.

Figure 3:
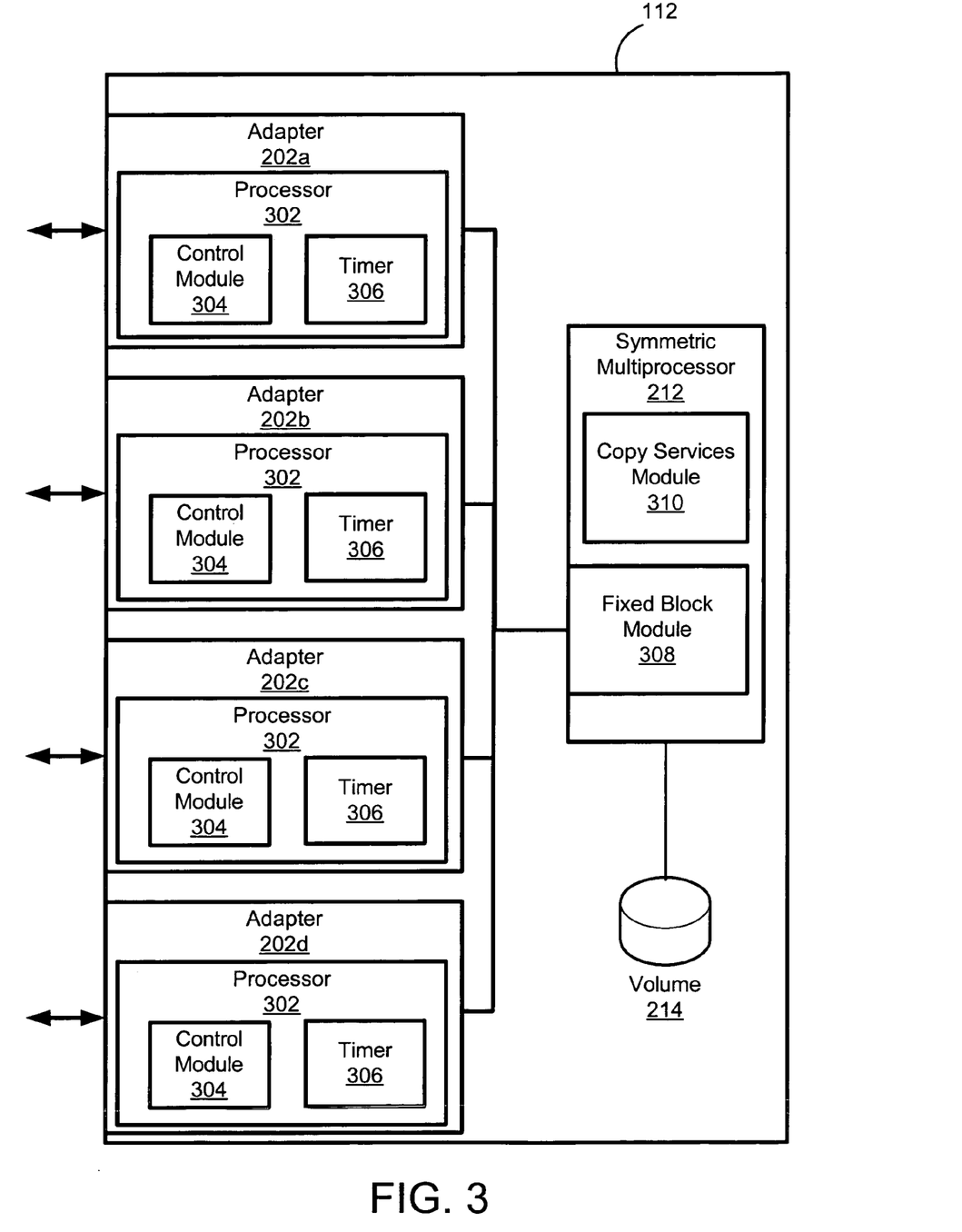
FIG. 3 is a schematic block diagram illustrating one embodiment of an apparatus for controlling link state changes in accordance with the present invention.

Referring now to FIG. 3, shown therein is a schematic block diagram graphically illustrating one embodiment of the apparatus 104 for controlling link state changes in accordance with the present invention. In one embodiment, the adapters 202 comprise a processor 302, a control module 304, and a timer module 306. The control module 304 may be configured to operate within the processor and establish logical connections with specified target storage devices 106. Additionally, the control module 304 is configured to maintain a connection status for each logical connection established. The maintenance of the connection status will be discussed in greater detail below with reference to FIGS. 4 and 5.

The adapters 202 may also be configured to communicate with the SMP 212. In one embodiment, the SMP 212 comprises a fixed block module for interfacing the adapters 202 with a copy services module 310. The copy services module 310 is configured to maintain the connection status of each logical connection established by each adapter 202. Additionally, the copy services module 310 is configured to respond to channel commands by establishing or removing logical links on any one of the various adapters 202.

Once one of the adapters 202 has received a command from the copy services module 310, the adapter 202 connects to the target storage server 106. The copy services module 310 issues commands to verify the connection has been established with the correct target storage server 106. Should the connection state change (i.e. loss of light for some amount of time), the control module 304 of the adapter 202 is configured to notify the copy services module 310 of the state change so that the logical path will no longer be used.

Figure 4A:
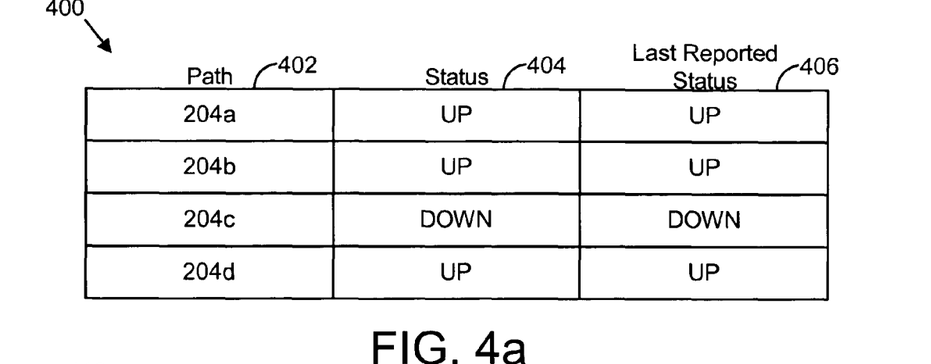
FIG. 4a is a schematic block diagram graphically illustrating one embodiment of a connection status table in accordance with the present invention.

FIG. 4a is a schematic block diagram graphically illustrating a connection status table 400 for one adapter 202 in accordance with the present invention. In one embodiment, the connection status table 400 comprises a look up file that may be stored in a portion of the adapter 202 RAM. Alternatively, the connection status table 400 may comprise a database configured to store and organize the connection status of each logical so connection. The connection status table 400 may include specified identifying information such as the logical connection or path 402, connection status 404, and a last reported connection status 406. In a further embodiment, the connection status table 400 may be configured to store additional information such as error codes.

In one embodiment, the adapter 202a may detect the connection status of the logical connection 204a is operational or "UP," and subsequently store the connection status in the connection status table 400. Alternatively, the connection status of the logical connection 204c may be nonoperational or "DOWN." In the depicted embodiment, the connection status table 400 includes the connection status of four logical connections 204a, 204b, 204c, 204d. In a further embodiment, the connection status table 400 may be configured to maintain the connection status of at least the number of existing logical connections.

Figure 4B:
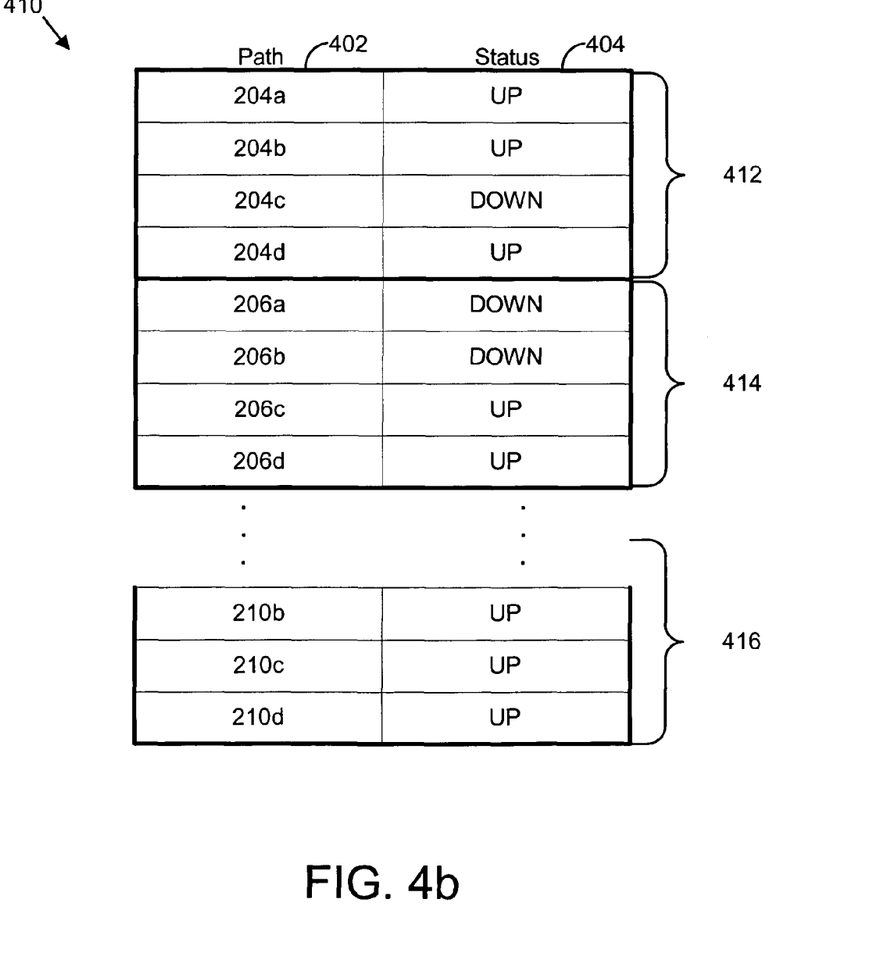
FIG. 4b is a schematic block diagram graphically illustrating an alternative embodiment of a connection status table in accordance with the present invention.

FIG. 4b is a schematic block diagram graphically illustrating one embodiment of a connection status table 410 for a plurality of adapters. In one embodiment, the connection status table 410 comprises a look up file that may be stored in a portion of the SMP 212 RAM. Alternatively, the connection status table 410 may comprise a database configured to store and organize the connection status of each logical connection. The connection status table 410 is configured to store the path 402 and status 404 information of each adapter 202. For example, information from adapter 202a may be stored in a first portion 412 of the connection status table 410, and likewise, information from subsequent adapters 202b, 202c, 202d may be stored in portions 414, 416.

Figure 5:
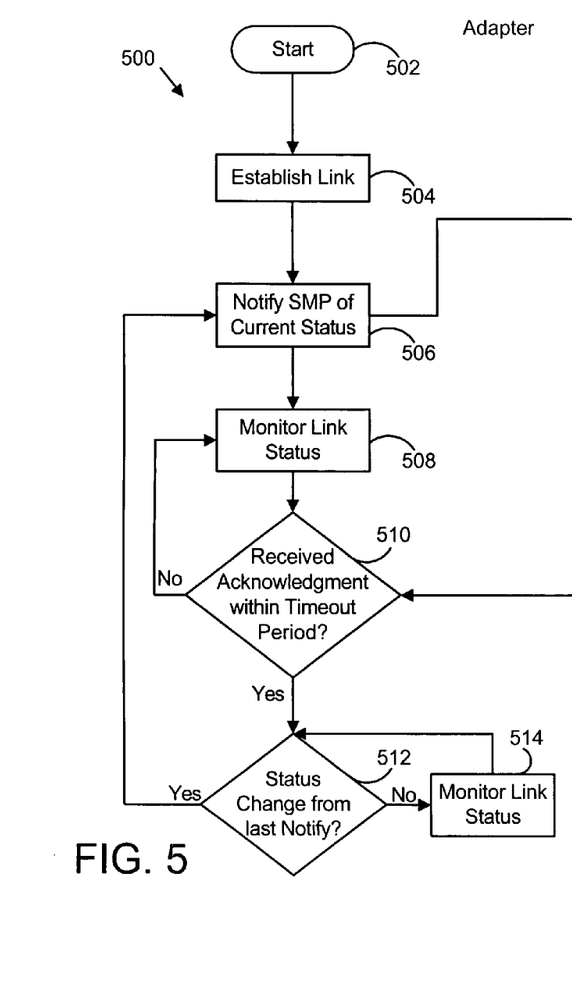
FIG. 5 is a schematic flow chart diagram illustrating one embodiment of a method for monitoring link status changes in accordance with the present invention.
Figure 6:
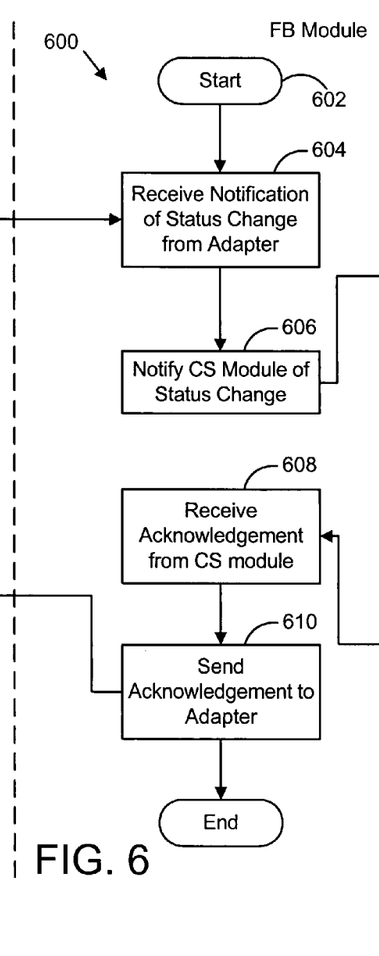
FIG. 6 is a schematic flow chart diagram illustrating one embodiment of a method for interfacing multiple independent modules in accordance with the present invention.
Figure 7:
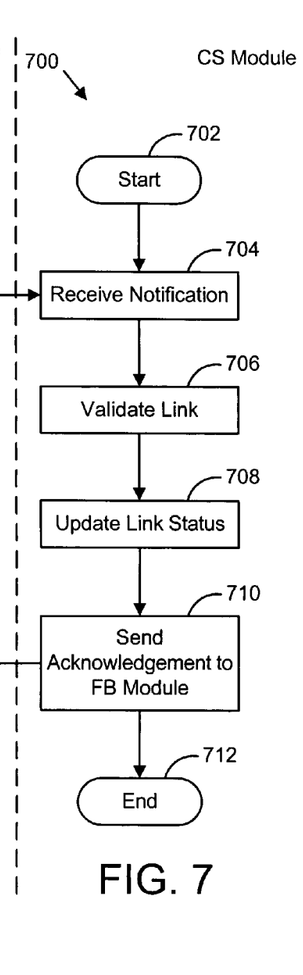
FIG. 7 is a schematic flow chart diagram illustrating one embodiment of a method for updating and validating link status changes in accordance with the present invention.

FIGS. 5, 6, and 7 are schematic flow chart diagrams that collectively graphically illustrate methods 500, 600, 700 for controlling link state changes in accordance with the present invention. FIG. 5 graphically illustrates a method for monitoring link status changes. The method 500 starts 502 and the adapter 202 is commanded to establish a link 504. The adapter 202 detects the current status of the logical connection and notifies 506 the SMP 212 of the connection status. Upon sending 506 the notification, the control module 304 starts the timer module 306. While waiting 510 for an acknowledgement for the notification sent to the SMP, the adapter 202 monitors 508 the link status. Before a timeout period has been reached, if no acknowledgement is received 510, the adapter continues to monitor 508 the link status. If the timeout period is reached 510, the storage module 112 is configured to reset and not wait for the acknowledgement. By resetting, the corresponding logical path is not stuck in a 'WAIT' state where the control module 304 cannot report further link state changes or delete the logical path.

Upon receiving 510 the acknowledgement, the control module 304 checks the current status 404 with the last reported status 406. If the status has changed 512, the control module again notifies 506 the SMP 212 of the current status and the method 500 is repeated. Alternatively, if the current status 404, and the last reported status 406 are the same, the control module continues monitoring 514 the link status until a status change 512 occurs. Although the depicted method 500 describes the interaction of the control module 212 and one logical connection, the control module 212 is configured to monitor and update the status of a plurality of logical connections simultaneously.

FIG. 6 is a schematic flow chart diagram illustrating one embodiment of a method 600 for interfacing multiple independent modules in accordance with the present invention. In one embodiment, the method 600 starts 602 and the fixed block module 308 receives 604 notification of status change from the adapter 202. Upon receiving 604 the notification, the fixed block module 308 notifies 606 the copy services module 310 of the status change. The fixed block module 308 receives 608 the acknowledgement from the copy services module 310 and sends 610 the acknowledgement to the adapter 202. In an alternative embodiment, the fixed block module 308 may be removed and the copy services module 310 configured to communicate directly with the adapter 202.

FIG. 7 is a schematic flow chart diagram graphically illustrating one embodiment of a method 700 for updating and validating link status changes in accordance with the present invention. The method 700 starts 702 and the copy services module 310 receives 704 the adapter 202 notification from the fixed block module 308. The copy services module 310 may then issue a command to validate 706 the link. In one embodiment, validating 706 the link may comprise validating that the link has been established with the correct target storage device 106. Once validated 706, the copy services module 310 updates 708 the link status in the connection status table 410 and sends 710 the acknowledgement to the fixed block module 308. The method 700 then ends 712.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for controlling link state changes, the apparatus comprising:

a copy services module configured to control a plurality of link adapters, each link adapter having a control module configured to establish a plurality of communication links between a source and a target storage device, and each link adapter configured to monitor the status of the plurality of communication links;

each control module further configured to transmit a first link status change notification associated with the establishment of a communication link to the copy services module after the communication link is established, start a timer upon transmitting the first link status change notification, and stop the timer upon receiving an acknowledgement from the copy services module that the established communication link has been validated, wherein each link adapter continuously monitors the status of the established communication link while the timer is running, and wherein the control module waits to transmit a second link status change notification to the copy services module until after the timer has stopped, the second link status change notification being associated with a monitored status change of the established communication link occurring while the timer is running; and the copy services module further configured to simultaneously process link status change notifications from a plurality of communication links;

wherein after receiving the acknowledgement from the copy services module, the control module compares the latest monitored status of the established link with a status of the established link associated with the first link status change notification, wherein the second link status change notification is generated by the control module and transmitted to the copy services module only if the latest monitored status is different than the status of the established link associated with the first link status change notification.

2. The apparatus of claim 1, wherein the control module is further configured to stop the timer upon reaching a predefined time value.

3. The apparatus of claim 2, wherein the control module and the copy services module are configured to reset in response to the timer reaching the predefined timeout value.

4. The apparatus of claim 1, wherein the control module is further configured to detect a link status change.

5. The apparatus of claim 1, wherein the copy services module is further configured to maintain the link status for each of the plurality of communication links.

6. The apparatus of claim 1, wherein the copy services module is further configured to validate the link status upon receiving the link status change notification.

7. The apparatus of claim 1, wherein the copy services module is further configured to update the link status in response to the received link status change notification and subsequent validation.

8. A system for controlling link state changes, the system comprising:

a data communications network comprising a plurality of communication channels;

a source storage device coupled to the data communications network and configured to establish a plurality of communication links with a target storage device coupled to the data communications network;

a host coupled to the data communications network configured to transmit read/write requests to the source storage device;

a copy services module configured to control a plurality of link adapters, each link adapter having a control module configured to establish a plurality of communication links between a source and a target storage device, and each link adapter configured to monitor the status of the plurality of communication links;

each control module further configured to transmit a first link status change notification associated with the establishment of a communication link to the copy services module after the communication link is established, start a timer upon transmitting the first link status change notification, and stop the timer upon receiving an acknowledgement from the copy services module that the established communication link has been validated, wherein each link adapter continuously monitors the status of the established communication link while the timer is running, and wherein the control module waits to transmit a second link status change notification to the copy services module until after the timer has stopped, the second link status change notification being associated with a monitored status change of the established communication link occurring while the timer is running; and the copy services module further configured to simultaneously process link status change notifications from a plurality of communication links;

wherein after receiving the acknowledgement from the copy services module, the control module compares the latest monitored status of the established link with a status of the established link associated with the first link status change notification, wherein the second link status change notification is generated by the control module and transmitted to the copy services module only if the latest monitored status is different than the status of the established link associated with the first link status change notification.

9. The system of claim 8, wherein the control module is further configured to stop the timer upon reaching a predefined time value.

10. The system of claim 8, wherein the control module and the copy services module are configured to reset in response to the timer reaching the predefined timeout value.

11. A computer readable storage medium encoded with computer executable instructions configured to carry out a method for controlling link state changes, the method comprising:

controlling a plurality of link adapters each having a control module and configured to establish a plurality of communication links between a source and a target storage device, each link adapter being configured to monitor the status of the plurality of communication links;

transmitting a first link status change notification associated with the establishment of a communication link to a copy services module after the communication link is established;

starting a timer upon transmitting the first link status change notification, and stopping the timer upon receiving an acknowledgement from the copy services module that the established communication link has been validated, wherein each link adapter continuously monitors the status of the established communication link while the timer is running, and wherein the control module waits to transmit a second link status change notification to the copy services module until after the timer has stopped, the second link status change notification being associated with a monitored status change of the established communication link occurring while the timer is running;

simultaneously processing link status change notifications from a plurality of communication links; and after receiving the acknowledgement from the copy services module, comparing the latest monitored status of the established link with a status of the established link associated with the first link status change notification, and generating the second link status change notification and transmitting the second link status change notification to the copy services module if the latest monitored status is different than the status of the established link associated with the first link status change notification.

12. The computer readable storage medium of claim 11, wherein the method further comprises stopping the timer upon reaching a predefined time value.

13. The computer readable storage medium of claim 12, wherein the method further comprises resetting the control module and the copy services module in response to the timer reaching the predefined timeout value.

14. The computer readable storage medium of claim 11, wherein the method further comprises detecting a link status change.

15. The computer readable storage medium of claim 11, wherein the method further comprises maintaining a link status for each of the plurality of communication links.

16. The computer readable storage medium of claim 11, wherein the method further comprises validating the link status upon receiving the link status change notification.

17. The computer readable storage medium of claim 11, wherein the method further comprises updating the link status in response to the received link status change notification.

18. A method for controlling link state changes, the method comprising:

controlling a plurality of link adapters each having a control module and configured to establish a plurality of communication links between a source and a target storage device, each link adapter being configured to monitor the status of the plurality of communication links;

transmitting a first link status change notification associated with the establishment of a communication link to a copy services module after the communication link is established;

starting a timer upon transmitting the first link status change notification, and stopping the timer upon receiving an acknowledgement from the copy services module that the established communication link has been validated, wherein each link adapter continuously monitors the status of the established communication link while the timer is running, and wherein the control module waits to transmit a second link status change notification to the copy services module until after the timer has stopped, the second link status change notification being associated with a monitored status change of the established communication link occurring while the timer is running;

simultaneously processing link status change notifications from a plurality of communication links; and after receiving the acknowledgement from the copy services module, comparing the latest monitored status of the established link with a status of the established link associated with the first link status change notification, and generating the second link status change notification and transmitting the second link status change notification to the copy services module if the latest monitored status is different than the status of the established link associated with the first link status change notification.

\* \* \* \* \*